US012064812B2

(12) United States Patent
Jüchter et al.

(10) Patent No.: US 12,064,812 B2
(45) Date of Patent: Aug. 20, 2024

(54) ADDITIVE MANUFACTURING OF REFRACTORY METALS WITH REDUCED LEVEL OF CONTAMINATION

(71) Applicant: Heraeus Deutschland Gmbh & Co. KG, Hanau (DE)

(72) Inventors: Vera K. Jüchter, Hanau (DE); Bernd Spaniol, Hammersbach (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 464 days.

(21) Appl. No.: 17/224,885

(22) Filed: Apr. 7, 2021

(65) Prior Publication Data
US 2021/0316366 A1    Oct. 14, 2021

(30) Foreign Application Priority Data

Apr. 8, 2020 (EP) .................................... 20168652

(51) Int. Cl.
| B22F 10/28 | (2021.01) |
| B22F 1/05  | (2022.01) |
| B22F 5/00  | (2006.01) |
| B22F 9/08  | (2006.01) |
| B22F 9/16  | (2006.01) |
| B33Y 10/00 | (2015.01) |
| B33Y 70/00 | (2020.01) |
| B33Y 80/00 | (2015.01) |

(52) U.S. Cl.
CPC ............... *B22F 10/28* (2021.01); *B22F 1/05* (2022.01); *B22F 5/007* (2013.01); *B22F 9/08* (2013.01); *B22F 9/16* (2013.01); *B33Y 10/00* (2014.12); *B33Y 70/00* (2014.12); *B33Y 80/00* (2014.12); *B22F 2301/20* (2013.01); *B22F 2304/10* (2013.01)

(58) Field of Classification Search
CPC ......... C22C 1/02; C22C 1/045; C22C 1/0458; C22C 27/00; C22C 27/02; C22C 27/025; C22C 27/04; C22C 27/06; B33Y 10/00; B33Y 70/00; B33Y 70/10; B22F 2202/11; B22F 2301/20; B22F 2301/205; B22F 10/28
See application file for complete search history.

(56) References Cited

U.S. PATENT DOCUMENTS

| 9,023,765 B1 | 5/2015 | Rimmer et al. | |
| 2015/0174658 A1* | 6/2015 | Ljungblad | B22F 10/28 425/141 |
| 2017/0189962 A1* | 7/2017 | Kestler | B22F 1/05 |
| 2018/0119239 A1* | 5/2018 | Tuffile | C22C 38/44 |
| 2020/0276639 A1* | 9/2020 | Leichtfried | C22C 1/045 |
| 2022/0023941 A1* | 1/2022 | Weinmann | B22F 1/065 |

FOREIGN PATENT DOCUMENTS

| CN | 104755197 A | 7/2015 | |
| CN | 108543951 A | 9/2018 | |
| CN | 110181048 A | 8/2019 | |
| EP | 3006139 A1 * | 4/2016 | ............. B22F 3/101 |
| WO | 2014071135 A1 | 5/2014 | |
| WO | WO-2016150720 A1 | 9/2016 | |
| WO | WO-2019068117 A1 | 4/2019 | |
| WO | WO-2019197376 A1 * | 10/2019 | .......... A61C 8/0012 |
| WO | WO-2020102832 A1 | 5/2020 | |
| WO | WO-2020102834 A1 | 5/2020 | |

* cited by examiner

*Primary Examiner* — Vanessa T. Luk
(74) *Attorney, Agent, or Firm* — Blank Rome LLP

(57) ABSTRACT

Additive manufacturing method for producing moldings comprising or consisting of an element selected from the group of refractory metals, wherein refractory metal powder having an oxygen content of at least 500 mol ppm is used for the additive manufacturing method.

15 Claims, No Drawings

ADDITIVE MANUFACTURING OF REFRACTORY METALS WITH REDUCED LEVEL OF CONTAMINATION

This Application claims the benefit of European Application No. EP 20168652.4 filed Apr. 8, 2020, the entire contents of which are incorporated by reference herein.

The invention relates to a method for the additive manufacturing of moldings containing refractory metals and having a reduced level of contamination, and to the use of refractory metal powders for producing components having a reduced level of contamination.

Additive manufacturing is becoming more and more established as an industrial-scale production method. Additive manufacturing methods can play to their advantages in particular in the production of components with complex geometries, or in fields where material savings are important.

A large number of materials can already be processed using additive manufacturing methods. Powder bed-based methods for producing dense and mechanically solid components are particularly suitable for metals.

Standard EN ISO/ASTM 52921:2017 classifies the additive manufacturing methods in categories. The following is suitable for the additive manufacturing of metallic molds, for example:

- "Powder bed fusion" (powder bed-based methods): Additive manufacturing method in which defined regions are fused in a powder bed by a locally selective energy input (e.g. by a laser beam or electron beam);
- "Directed energy deposition": Additive manufacturing method in which bundled thermal energy is used to bond materials together at their application site via fusing;
- "Binder jetting": Additive manufacturing method in which a liquid binder is selectively applied to solidify a powder;
- "Sheet lamination": Additive manufacturing method in which layers of a material are surface-bonded to form an object.

Known powder bed-based methods are selective laser melting (SLM) and selective electron beam melting (EBM). In these methods, a component is created step by step via the layered application and subsequent fusion of powder layers.

The principles of additive manufacturing via selective electron beam melting are described by C. Körner et al. in "Schweißen and Schneiden" [Welding and Cutting], 69, 2017, Vol. 1-2, pp. 30-38. Electron beam melting is a powder bed-based additive manufacturing method in which a metal powder is applied in layers and the metal in each applied layer is melted in defined regions by the electron beam. After solidification of the melted metal in a layer, a further powder layer can be applied. In order to achieve high process stability, the applied metal powder layer is preferably subjected to preheating (for example with a defocused electron beam) before melting. The powder is thereby at least partially sintered, and the sintered metal is then melted in defined regions of the layer with a focused electron beam. Electron beam melting takes place under vacuum.

Refractory metals present a challenge in additive manufacturing due to the high affinity for oxygen and the high melting temperatures. In particular, the high surface area of the powders that are used promotes the introduction of oxygen into the moldings made of refractory metals that are to be produced. A high oxygen content in the molding to be produced can lead to a brittle material, among other things. Given niobium, for example, the superconductivity is reduced by oxygen contamination.

For example, for high mechanical strength it may be necessary that the metallic components contain a low level of contamination. In particular, contamination in the form of oxygen can make the components brittle or can reduce conductivity.

Methods for producing niobium components which use high-purity niobium powders having an RRR value of 300 are known from the prior art U.S. Pat. No. 9,023,765 B1. The RRR value is a measure of superconductivity. An RRR value of 300 requires very pure material and typically has an oxygen content of approximately 10 ppm. These powders are very complex to produce, store, and process. Here, the production and processing process of niobium powders takes place almost exclusively under a protective gas atmosphere in order to minimize the introduction of oxygen into the component to be produced. It was previously assumed in the prior art that a low oxygen content of the powder is absolutely necessary in order to produce components that are as pure as possible.

An object of the invention was to provide an improved additive manufacturing method in which easily manageable powders can be used to produce high-quality moldings.

One object of the invention was, in particular, to provide a cost-effective method.

A further object was to provide a method by means of which optimally pure moldings of refractory metal can be constructed.

At least one of the preceding objects is achieved by the subject matters of the independent claims. Preferred embodiments of the invention are found in one or more dependent claims.

In a first aspect, the invention relates to an additive manufacturing method for producing moldings comprising or consisting of an element selected from the group of refractory metals, characterized by the steps of:
 a) applying a first powder layer onto a substrate, wherein the powder comprises or consists of refractory metal,
 b) selectively melting at least a portion of the powder layer by means of electron beam,
 c) cooling the melt below the solidification temperature to obtain a first material layer,
 d) applying a further powder layer onto the first material layer, wherein the powder comprises or consists of refractory metal,
 e) selectively melting at least a portion of the further powder layer by means of electron beam,
 f) cooling the melt below the solidification temperature to obtain a further material layer,
 g) repeating steps d)-f) until the molding is completely constructed, wherein the powder of the powder layers in step a) and d) respectively has an oxygen content of at least 500 mol ppm.

Within the scope of the present invention, it has surprisingly been found that, even with refractory metal powders having a high oxygen content, components having high purity and a low oxygen content can be produced.

In particular, it has been found that, with the method according to the invention, the oxygen content of the molding can be reduced relative to the powder by at least 15 mol %, in particular at least 25 mol %, and very particularly by at least 100 mol %.

In a preferred embodiment of the present invention, the refractory metal is selected from the group consisting of tungsten, niobium, tantalum, chromium, molybdenum, or rhenium. The refractory metal is preferably tungsten or niobium, particularly preferably niobium. The amount of metal, in particular refractory metal, in the powder of the powder layer is preferably 99.5 wt % or more, in particular 99.9 wt % or more. Furthermore, the powder of the powder layers preferably consists of one or more refractory metals. Excluded from this are unavoidable impurities, such as oxygen, for example from the production process of the powders. In particular, the particles of the powder have no core-shell structure or contain one or more ceramics. Furthermore, the powder layers according to the invention preferably contain no further constituents besides the powder comprising refractory metal, in particular no further solids or liquids.

The refractory metal may be an elemental refractory metal or an alloy of refractory metal.

Insofar as the refractory metal is present as an elemental refractory metal, it contains other metals only in the form of unavoidable impurities. The impurities can be present, for example, in a total amount of less than 0.5 wt %, preferably less than 0.2 wt % or even less than 0.1 wt %.

Insofar as the refractory metal is present as an alloy, the alloy contains one or more of the aforementioned refractory metals in an amount of more than 50 at %, more preferably ≥70 at %, even more preferably 90 at %, for example in the range of 90-99 at %. For example, if the refractory metal is tungsten and is present as an alloy, the tungsten-containing alloy may contain, for example, one or more of the following non-refractory metals selected from the group consisting of Ni, Fe, Co, and Cu as an alloying element. Optionally, a portion of the tungsten in the alloy may be substituted by one or more of the following refractory metals selected from the group consisting of Ta, Mo, and Re.

In one possible embodiment, the refractory metal may be present in an alloy. For example, if the refractory metal is niobium and is present in an alloy, the niobium-based alloy may contain, for example, one or more of the following non-refractory metals selected from the group consisting of Sn, Ge, Ti, and Zr. Optionally, a portion of the niobium may be substituted by one or more of the refractory metals selected from the group consisting of Ta, Mo, and Re.

In a preferred embodiment of the invention, the provided powder layers contain essentially no carbon or a carbonaceous compound in steps a) and d). The carbon or the carbonaceous compound can be carbon black, a petroleum compound, or graphite, for example. In particular, the provided powder layer does not contain any substances which react with oxygen, in particular no substances which react during the process to form gaseous compounds. Substances which react with oxygen can, for example, draw oxygen from the refractory metals. They can also be called oxygen scavengers. Furthermore, the powder layer may be essentially free of solid or liquid nonmetals. Within the scope of the invention, the term "essentially" means no intentionally added amounts of these components. Unavoidable impurities are excluded from this. In that the powder layers in a) and d) contain essentially no substances which react with oxygen, the powders of the powder layers can be produced in a particularly simple manner. Given oxygen scavengers, there is the risk that they will remain in the obtained material layers and thus contaminate them.

For example, in the event of carbon as oxygen scavenger, the obtained material layers may contain carbides. The moldings produced according to the invention preferably contain no carbides.

The refractory metal powder can be produced by means of EIGA (electrode induction melting inert gas atomization), for example. If required, a suitable fraction having the required particle size distribution can be taken from the produced raw powder by means of fractionation (for example screening and sieving). How suitable powders can be fractionated is known to the person skilled in the art.

The powder comprising refractory metal may, for example, have a volume-based particle size distribution with a $d_{50}$ value in the range from 10 μm to 150 μm, in particular 10 μm-100 μm or 50 μm-150 μm. In another embodiment, the refractory metal powder may have, for example, a volume-based particle size distribution having a $d_{50}$ value in the range of 10 μm-50 μm. Given such particle size distributions, a particularly preferred oxygen reduction can occur in the component as compared to the powder that is used.

In step a), a first powder layer is applied to a substrate, wherein the powder comprises refractory metal. The application is performed with a roller or a doctor blade, for example. The substrate can be, for example, a build plate of an additive manufacturing systems or a component produced in any way.

In a preferred embodiment, the volume-based particle size distribution of the powder has a $d_{10}$ value of at least 10 μm and a $d_{90}$ value of at most 200 μm. In particular, the particle size distribution of the powder lies has a $d_{10}$ value of at least 45 μm and a $d_{90}$ value of at most 150 μm.

In a further possible embodiment, the volume-based particle size distribution has a $d_{10}$ value of 10 μm or more, in particular 20 μm or more, and very particularly 30 μm or more, for example 50 μm or more. Furthermore, the volume-based particle size distribution preferably has a $d_{90}$ value of 200 μm or less, in particular 150 μm or less, 100 μm or less, and particularly preferably 55 μm or less.

The refractory metal powder has, for example, a BET surface area of less than 0.07 $m^2/g$, more preferably less than 0.05 $m^2/g$.

The oxygen content of the powder of the powder layer is at least 500 mol ppm, preferably at least 800 mol ppm or at least 1000 ppm, and particularly preferably at least 1500 mol ppm.

The oxygen content of the powder of the powder layer may be at most 1000 μg/g, for example. Expressed in molar amounts, the oxygen content may be at most 5000 mol ppm, for example.

In one embodiment of the invention, the powder of the powder layer is heated, for example to a temperature in the range of 500° C.-1100° C. The powder of the powder layer can preferably be heated to 500° C.-900° C. if the powder contains niobium. The powder of the powder layer can preferably be heated to 700° C.-1100° C. if the powder contains tungsten.

For example, the powder layer may have a thickness in the range of 25 μm-250 μm.

A selective melting of at least a portion of the powder layer takes place by means of electron beam in step b). For additive manufacturing methods, a virtual model (CAD file) of a component to be produced is typically broken down into individual layers. This is also referred to as slicing. The layers calculated in this way are then manufactured individually and assembled, by stacking them atop one another, to form the finished molding. The at least one portion of the powder layer which is selectively melted according to the invention corresponds to a single calculated layer in the virtual model of the molding.

Selective melting of the powder layer preferably takes place completely, meaning that the morphology of the particles of the powder is completely lost in the molten region and a homogeneous melt is created.

In a preferred embodiment, the selective melting not only melts the powder of the applied powder layer but also the underlying region, i.e. the substrate. Thus, the molten portion of the powder layer may be bonded not only within the layer but also to the underlying region. A good connection of the first applied layer of the molding can be advantageous for the further construction of the molding since a detachment of the overlying layer can be avoided.

The selective melting preferably takes place via line-by-line rastering of the portion to be selectively melted. The line width and the line pitch are preferably selected such that each region of the applied powder layer is melted at least twice. Thus, preferably each or essentially each volume element of the molding to be produced is respectively melted and subsequently solidified at least twice. Optionally, individual or all volume elements of the molding to be produced can be melted more than twice.

The selective melting preferably takes place with an energy input, expressed as a volume energy, of at least 40 J/mm³, in particular at least 100 J/mm³, and particularly preferably at least 250 J/mm³. The oxygen content can thereby be lowered particularly effectively.

The selective melting preferably takes place with an energy input, expressed as a volume energy, of at most 800 J/mm³, in particular at least 600 J/mm³.

In another possible embodiment, the selective melting takes place with a volume energy in the range of 40 J/mm³-800 J/mm³.

The volume energy is calculated as follows according to VDI Guideline 3405:

$$E_v = \frac{P}{v_s * h_d * d_z},$$

wherein the following are specified
$E_v$ ... volume energy in W/mm³,
P ... radiation power in W,
$v_s$ ... scanning speed in mm/s,
$h_d$ ... track pitch in mm, and
$d_z$ ... predetermined layer thickness according to virtual model (CAD file).

The selective melting preferably takes place at a pressure of $10^{-3}$ torr or less, in particular $10^{-4}$ torr or less, and very particularly $10^{-5}$ torr or less.

In step c), a cooling of the melt to below the solidification temperature takes place to obtain a first material layer. The material layer preferably contains a contiguous structure in the selectively melted portions of the powder layer. Non-contiguous powder is preferably present outside the selectively melted portions of the powder layer. The material layer can preferably have the same composition as the powder that is used, with respect to the refractory metal content.

The cooling of the melt to below the solidification temperature can be effected via active cooling or via passive cooling, for example in that the melt is no longer being heated by an electron beam.

In step d), a further powder layer is applied onto the first material layer, wherein the powder comprises refractory metal. The application of the powder layer preferably takes place using the same techniques as in step a).

In step e), at least a portion of the further powder layer is selectively melted by means of electron beam. Preferably, the selective melting takes place under the same conditions as in step b). The specific parameters of the selective melting of the at least one further powder layer may be identical to or different from the parameters in step b). For example, the energy input into the powder layer can be adapted to the heat outflow. The underlying material layer is preferably also melted by the selective melting of the further powder layer.

In step f), the melt is cooled to below the solidification temperature to obtain a further material layer. Step f) preferably takes place analogously to step c). By cooling below the solidification temperature, the further material layer preferably bonds to the underlying material layer.

Steps d) to f) are implemented until the molding to be produced is constructed from the individual material layers.

In one possible embodiment of the invention, a molding is obtained via the additive manufacturing method, wherein the molding has an oxygen content which is at least 15% lower than the oxygen content of the powder.

In a further possible embodiment of the invention, a molding is obtained via the additive manufacturing method, wherein the molding has an oxygen content which is at least 25 mol % lower, or 50 mol % lower, or in particular 80 mol % lower than the oxygen content of the powder that is used.

Furthermore, in addition to the oxygen content, the nitrogen content in the manufactured molding can optionally also be reduced compared to the powder that is used.

Moldings of any desired geometry can be produced using the method according to the invention. In particular, the method can be used to obtain moldings which can be used as a catalytic converter, as components of high-temperature ovens, as an implant, as a heat protection device, as radiation protection components, or as superconductors, for example for particle accelerator technology.

In a further aspect, the invention relates to the use of refractory metal powder having an oxygen content of at least 500 mol ppm for producing moldings by means of additive manufacturing using an electron beam.

In a further aspect, the invention relates to the use of a refractory metal powder having an oxygen content of at least 500 mol ppm for producing moldings having an oxygen content of, at most, 85% relative to the oxygen content of the powder used, by means of additive manufacturing using an electron beam.

The features described above for the method can analogously also be transferred to the uses.

In a preferred embodiment, a refractory metal powder having an oxygen content of at least 800 mol ppm may be used.

In one possible embodiment, the refractory metal powder can be produced by means of EIGA (electrode induction melting inert gas atomization) or via precipitation.

The refractory metal powder is preferably used for producing a molding having a relative density of at least 95%, in particular at least 97%, and particularly preferably at least 99%.

Furthermore, the molding preferably has an oxygen content (in mol ppm) which is at least 15%, in particular at least 30%, and very particularly preferably at least 50% below the oxygen content of the refractory metal powder.

The mold formed from the refractory metal has, for example, a relative density of at least 95%, more preferably at least 97.0%, even more preferably at least 98.0%, or even at least 99.0%.

Measuring Methods
Relative Density

The relative density $D_{rel}$ (in %) results from $(\rho_{geo}/\rho_{th}) \times 100\%$, wherein $\rho_{geo}$ is the geometric density of the component and pth is the theoretical density of the component. The geometric density can be determined according to Archimedes' principle, for example with a hydrostatic balance. The theoretical density of the component corresponds to the theoretical density of the metal from which the component is formed.

Particle Size Distribution

The particle size distribution can be determined by laser diffraction according to ISO 13320:2009 with the "Helos BR/R3" device (Sympatec GmbH, Germany). The measuring range is thereby either 0.9-875 μm, depending on the particle sizes present in the powder.

For the dispersion of the powder particles, the RODODS/M dry dispersing system (Sympatec GmbH, Germany) with vibrating conveyor doser VIBRI (with Venturi nozzle) can be used. The sample quantity is 5 g. The wavelength of the laser radiation that is used is 632.8 nm. The evaluation can take place using the Mie theory. The particle sizes are obtained as a volume distribution, i.e., within the scope of the present invention, the particle size distribution is determined in the form of a volume distribution sum curve.

The $d_{10}$, $d_{50}$, and $d_{90}$ values can be calculated from the particle size distribution (volume distribution) measured by laser diffraction, as described in ISO 9276-2:2014.

Determination of Oxygen Content

The oxygen content is determined by means of carrier hot gas extraction with connected infrared detection. The oxygen content is measured according to the ASTM E 1409-2013 standard, which can be applied analogously for all refractory metals. The measurement was performed on the TC-436 instrument made by Leco (USA).

Of the manufactured parts, which are cubes in the present examples, some chips are separated and measured by the same method as the powder.

BET Surface

Measurement took place with nitrogen as an adsorbate at 77 K. The BET surface was determined using the multipoint method (ISO 9277:2010).

EXAMPLES

The general invention is clarified in the following section based on specific examples.

Respective cubes (10×10×10 mm) were produced from different refractory metal powders by means of selective electron beam melting, and the oxygen content and the density were determined. The following system was used for electron beam melting: Arcam A2X by Arcam AB. The manufacturing condition and the oxygen content of the respective powders that are used, and of the components produced therefrom, can be found in Table 1. As can be seen from the data, a reduction in oxygen content in the finished molding can be observed as a function of the energy input (indicated as volume energy in J/mm³). Below a certain value, the oxygen content even increases, whereas the oxygen content in the molding decreases above 20 J/mm³.

TABLE 1

| | Material | | Powder grain size $d_{50}$ μm | Volume energy (J/mm³) | Average O content mol ppm | Oxygen content in molding relative to powder mol % |
|---|---|---|---|---|---|---|
| 1 | Niobium | Powder | 45-106 | | 987 | |
| 1a | Niobium | Molding | | 20 | 1516 | 154 |
| 2 | Niobium | Powder | 45-106 | | 1413 | |
| 2a | Niobium | Molding | | 120 | 1123 | 81 |
| 3 | Niobium | Powder | 45-106 | | 1976 | |
| 3a | Niobium | Molding | | 141 | 1618 | 82 |
| 4 | Niobium | Powder | 45-106 | | 671 | |
| 4a | Niobium | Molding | | 141 | 549 | 82 |
| 5 | Niobium | Powder | 45-106 | | 2832 | |
| 5a | Niobium | Molding | | 160 | 2104 | 74 |
| 6 | Niobium | Powder | 45-106 | | 3085 | |
| 6a | Niobium | Molding | | 240 | 1644 | 53 |
| 6b | Niobium | Molding | | 340 | 1450 | 47 |
| 6c | Niobium | Molding | | 440 | 1385 | 45 |
| 6d | Niobium | Molding | | 600 | 1089 | 35 |
| 7 | Tungsten | Powder | 45-106 | | 2080 | |
| 7a | Tungsten | Molding | | 20 | 3263 | 157 |
| 7b | Tungsten | Molding | | 50 | 1310 | 63 |
| 7c | Tungsten | Molding | | 100 | 1126 | 54 |
| 8 | Tungsten | Powder | 45-106 | | 569 | |
| 8a | Tungsten | Molding | | 336 | 236 | 41 |
| 9 | Tungsten | Powder | 45-106 | | 925 | |
| 9a | Tungsten | Molding | | 600 | 40 | 4 |
| 10 | Tungsten | Powder | 15-45 | | 971 | |
| 10a | Tungsten | Molding | | 600 | 46 | 5 |

For example, the oxygen content in an additively manufactured tungsten molding can be reduced by 96 mol % relative to the oxygen content in the powder (cf. Example 9/9a). The oxygen content of a niobium molding can be reduced by 65 mol % relative to the oxygen content of the powder that is used, for example. It is thus also possible to use refractory metal powders having a comparatively high oxygen content in order to produce moldings having a markedly lower oxygen content.

The invention claimed is:

1. An additive manufacturing method for producing a molding, the method comprising the steps of:
   a) applying a first layer of a refractory metal powder onto a substrate, wherein the refractory metal powder comprises a refractory metal selected from niobium and tungsten,
   b) selectively melting at least a portion of the first layer by means of an electron beam, wherein the melting takes place with a volume energy of at least 40 J/mm³,
   c) cooling the melt below the solidification temperature to obtain a first material layer,
   d) applying a further layer of the refractory metal powder onto the first material layer,
   e) selectively melting at least a portion of the further layer by means of an electron beam, wherein the melting takes place with a volume energy of at least 40 J/mm³,
   f) cooling the melt below the solidification temperature to obtain a material layer,
   g) repeating steps d)-f) until the molding is completely constructed,
   wherein
      the refractory metal powder has an oxygen content of at least 500 mol ppm,
      the constructed molding has an oxygen content which is at least 15% lower than the oxygen content of the refractory metal powder, and
      the first and further layer do not contain substances that react with oxygen.

2. The additive manufacturing method of claim 1, wherein the oxygen content of the refractory metal powder is at most 5000 mol ppm.

3. The additive manufacturing method of claim 1, wherein the particles of the refractory metal powder have an average particle size diameter $d_{50}$ in the range from 10 to 150 μm.

4. The additive manufacturing method of claim 1, wherein the constructed molding has an oxygen content which is at least 25% lower than the oxygen content of the refractory metal powder.

5. The additive manufacturing method of claim 1, wherein the first and further layers in steps a) and d) contain essentially no carbon or carbonaceous compounds.

6. The additive manufacturing method of claim 1, wherein each volume element of the molding to be produced is melted and respectively solidifies thereafter at least twice.

7. The additive manufacturing method of claim 1, wherein the refractory metal powder has a $d_{10}$ value of at least 10 μm and a $d_{90}$ value of at most 200 μm.

8. The additive manufacturing method of claim 1, wherein the refractory metal is niobium.

9. The additive manufacturing method of claim 1, wherein the particles of the refractory metal powder have an average particle size diameter $d_{50}$ in the range from 10 μm-100 μm.

10. The additive manufacturing method of claim 1, wherein the particles of the refractory metal powder have an average particle size diameter do in the range from 10-50 μm.

11. The additive manufacturing method of claim 1, wherein the refractory metal powder has a BET surface area of less than 0.07 m²/g.

12. The additive manufacturing method of claim 1, wherein the constructed molding has a relative density of at least 95%.

13. The additive manufacturing method of claim 1, wherein at least 99.5 wt % of the refractory metal powder is the refractory metal.

14. The additive manufacturing method of claim 1, wherein the refractory metal is tungsten.

15. The additive manufacturing method of claim 1, wherein each of the first layer and the further layer have thicknesses in the from 25 μm to 250 μm.

* * * * *